(12) United States Patent
Huang et al.

(10) Patent No.: US 11,537,006 B2
(45) Date of Patent: Dec. 27, 2022

(54) OPTICAL FILM STRUCTURE

(71) Applicant: PROBRIGHT TECHNOLOGY INC., New Taipei (TW)

(72) Inventors: Pi Ta Huang, New Taipei (TW); Po Yin Kuo, New Taipei (TW)

(73) Assignee: Probright Technology Inc., New Taipei (TW)

( * ) Notice: Subject to any disclaimer, the term of this patent is extended or adjusted under 35 U.S.C. 154(b) by 0 days.

(21) Appl. No.: 17/648,268

(22) Filed: Jan. 18, 2022

(65) Prior Publication Data

US 2022/0317519 A1 Oct. 6, 2022

(30) Foreign Application Priority Data

Mar. 30, 2021 (TW) ................................. 110112044

(51) Int. Cl.
*G02F 1/13357* (2006.01)
*G02F 1/1335* (2006.01)

(52) U.S. Cl.
CPC .. *G02F 1/133611* (2013.01); *G02F 1/133607* (2021.01)

(58) Field of Classification Search
CPC ......... G02F 1/133611; G02F 1/133607; G02B 6/0053
See application file for complete search history.

(56) References Cited

U.S. PATENT DOCUMENTS

2015/0116833 A1* 4/2015 Boyd .................. G02B 5/0221
359/599
2017/0329160 A1* 11/2017 Konuma .............. G02B 5/0215

FOREIGN PATENT DOCUMENTS

| KR | 20090011286 A | * | 2/2009 | |
| WO | WO-2013055112 A1 | * | 4/2013 | .......... G02B 6/0053 |
| WO | WO-2014017778 A1 | * | 1/2014 | .......... G02B 5/0231 |

* cited by examiner

*Primary Examiner* — Erin Kryukova
(74) *Attorney, Agent, or Firm* — Rosenberg, Klein & Lee (57) ABSTRACT

The present invention provides an optical film structure, which comprises a base layer, a plurality of optical layers, and a prism layer. A first optical structure is disposed below the base layer such that the first optical structure can concentrate and alter an incident light source. By using the structure of the plurality of optical layers, the ineffective polarized light of the light source can be converted into effective polarized light. Furthermore, the first optical structure adjusts a focal point of the incident light source and thus increasing the luminous flux and brightness of the light source.

11 Claims, 7 Drawing Sheets

OPTICAL FILM STRUCTURE

FIELD OF THE INVENTION

The present invention relates generally to a structure, and particularly to an optical film structure.

BACKGROUND OF THE INVENTION

Liquid-crystal displays (LCD) are a novel display technology with advantages including high light-emitting efficiency, low power consumption, high reliability, and long usage time (long lifetime). Hence, they are regarded as one of the developable high technologies currently.

According to the location of light sources, the structures of LCD backlight modules can be classified into two types:
1. Edge type: Light sources are located on the periphery of the panel. A light guide plate is used to redirect the light emitted from the edge of the screen to the center.
2. Direct type: Light sources are located behind the panel. A diffuser is used to uniformly distribute the light. A brightness enhancement film is adopted to concentrate the light.

A brightness enhancement film enhances the brightness of an LCD backlight module and is one of the most important components therein. By using the principles of cyclic refraction of light and organizing internal reflection, a dual brightness enhancement film (DBEF) is formed by stacking multiple layers of thin film materials with anisotropic refractive indexes. Brightness enhancement films enhance the brightness of backlight modules and is one of the most important components therein. The main function of brightness enhancement films is to deflect light to the front viewing direction. Having the functions of concentrating light and enhancing brightness, brightness enhancement films are also called condensing films.

In a brightness enhancement film, the principles of refraction and reflection are used. By using a prism layer, the direction of light is modified and concentrated to the front. In addition, the light outside the viewing field can be recycled and reused. By improving the overall luminance and uniformity, the effect of brightness enhancement can be achieved.

Light waves are electromagnetic waves. Many normal materials, for example, the glass, own optical isotropy. These materials will maintain their physical properties regardless the polarization of light.

Nonetheless, some major birefringent materials or optically active materials own anisotropy. Thereby, if the polarization direction is different, the propagation of waves will be different. Alternatively, the polarization direction of waves will be changed. A brightness enhancement film allows incident light with a specific polarization direction to pass through and hence changing unpolarized light into polarized light.

In other words, when unpolarized light (the natural light) is emitted from LEDs and projected into the DBEF, the P polarized light will pass through while the S polarized light will be reflected by the DBEF. The reflected S polarized light will be scattered in the backlight module and changed to the unpolarized light before incident to the DBEF again.

Thereby, the DBEF can be used to recycle the S polarized light and thus increasing the utility of the luminous flux incident to the LCD. Accordingly, for semiconductor lighting and display technologies, the DBEF plays an important role.

The main function of brightness enhancement films is to enhance the brightness of backlight modules so that the displays of mobile phones, tablet computers, and digital cameras can be clearer and brighter as well as lowering power consumption. Thereby, they are one of the most important components in backlight modules.

Moreover, the brightness enhancement films according to the prior art are formed by extending materials for forming birefringent films. The process is complicated and costly. Besides, the focal locations of current brightness enhancement films cannot be adjusted for changing the viewing angle, the luminous flux, and the luminance.

Accordingly, how to adjust the focal point of optical films for improving the luminous flux and luminance has become the major technical challenge in the field.

SUMMARY

An objective of the present invention is to provide an optical film structure. By using the optical structure below the base layer, the focal location of the incident light source can be adjusted. By adjusting the focal location, the luminous flux and luminance of the light passing through the optical film can be enhanced.

To achieve the above objective, the present invention provides a base layer, a plurality of optical layers, and a prism layer. The plurality of optical layers includes a first optical layer and a second optical layer. A first material of the first optical layer has a first refractive index; a second material of the second optical layer has a second refractive index. When a light source enters the base layer from the bottom of the base layer, the incident angle of the light source is altered by a first optical structure and producing a light focal point of the light source. The light source enters the plurality of optical layers. By using a plurality of optical particles, the first refractive index, and the second refractive index, a first polarization phase and a second polarization phase of the light source are adjusted to become the same emergent-light phase before passing through the prism layer.

According to an embodiment of the present invention, the material of the base layer is PMMA, PET, or PC.

According to an embodiment of the present invention, a second optical structure is disposed on the main body.

According to an embodiment of the present invention, the first optical structure and the second optical structure are non-spherical structures or dot structures.

According to an embodiment of the present invention, a glass layer is disposed on the prism layer.

According to an embodiment of the present invention, the prism layer includes one or more recess part and one or more projective part. The one or more recess part and the one or more projective part are adjacent to one another and arranged in a nonlinear structure.

According to an embodiment of the present invention, the one or more projective part includes a top part with a round tip thereon. The radius of the round tip is between 0.01 and 0.05 millimeter.

According to an embodiment of the present invention, the material of the optical particles is PMMA or PS.

According to an embodiment of the present invention, the first optical layer has a first thickness; the second optical layer has a second thickness. The first thickness and the second thickness are between 40 and 200 nanometers.

According to an embodiment of the present invention, the material of the first material and the second material is PMMA or PS.

According to an embodiment of the present invention, the light focal point is located inside the base layer, inside the prism layer, or outside the optical film.

DETAILED DESCRIPTION

In order to make the structure and characteristics as well as the effectiveness of the present invention to be further understood and recognized, the detailed description of the present invention is provided as follows along with embodiments and accompanying figures.

The brightness enhancement films according to the prior art are formed by extending materials for forming birefringent films. The process is complicated and costly. Besides, the focal locations of current brightness enhancement films cannot be adjusted for changing the viewing angle, the luminous flux, and the luminance.

The advantages of the present invention to dispose the first optical structure below the base layer of the optical film according to the present invention. The first optical structure can concentrate and change the incident light source. Then the structure of the optical layer is used to convert the ineffectively polarized light of the incident light source into effectively polarized light. In addition, the first optical structure can adjust the focal location of the incident light source. By adjusting the focal location, the luminous flux and luminance of the light source passing through the optical film can be increased.

In the following description, various embodiments of the present invention are described using figures for describing the present invention in detail. Nonetheless, the concepts of the present invention can be embodied by various forms. Those embodiments are not used to limit the scope and range of the present invention.

Figure 1A:
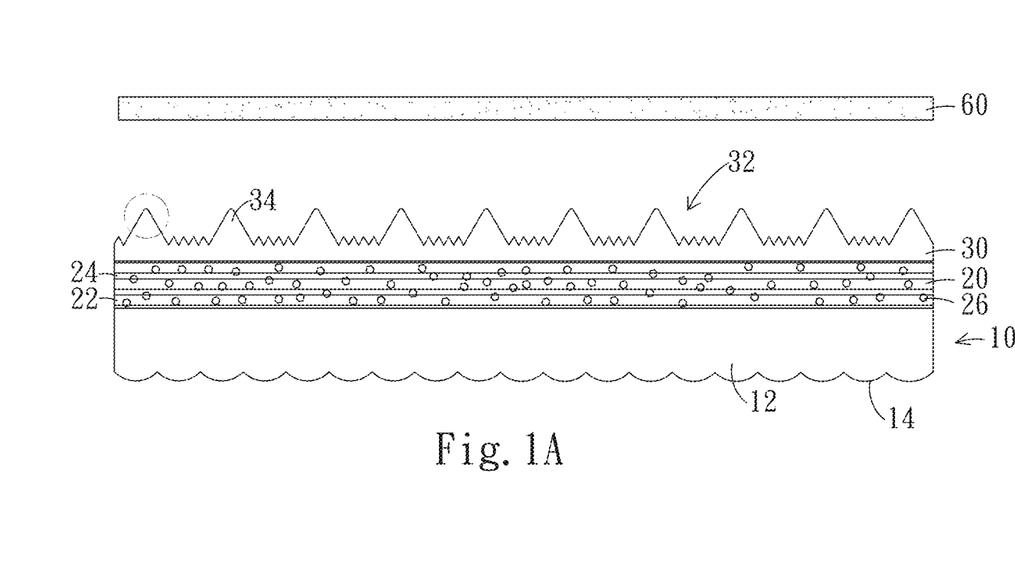
FIG. 1A shows a structural schematic diagram according to an embodiment of the present invention.

First, please refer to FIG. 1A, which shows a structural schematic diagram according to an embodiment of the present invention.

As shown in the figure, the structure according to the present embodiment comprises a base layer 10, a plurality of optical layers 20, and a prism layer 30.

The base layer 10 includes a main body 12 and a first optical structure 14. The first optical structure 14 is disposed below the main body 12. The material of the base layer 10 is PMMA, PET, or PC.

The plurality of optical layers 20 are disposed on the base layer 10 and include a first optical layer 22 and a second optical layer 24. The first optical layer 22 and the second optical layer 24 include a plurality of optical particles 26. The material of the plurality of optical particles 26 is PMMA or PS. The transmittance of the plurality of optical layers 20 is 45~50%.

The first optical layer 22 has a first thickness; the second optical layer 24 has a second thickness. The first thickness and the second thickness are between 40 and 200 nanometers. A first material of the first optical layer 22 has a first refractive index; a second material of the second optical layer 24 has a second refractive index. Furthermore, the first refractive index and the second refractive index are between 1.49 and 1.59. The material of the first material and the second material is PMMA or PS.

Figure 1B:
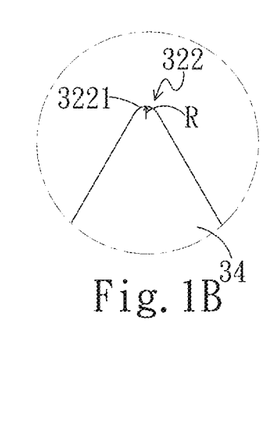
FIG. 1B shows an enlarged view of the recess and projective structure according to an embodiment of the present invention.

The prism layer 30 is disposed on the plurality of optical layers 20. The prism layer 30 include one or more recess part 32 and one or more projective part 34. The one or more recess part 32 and the one or more projective part 34 are adjacent to one another and arranged in a nonlinear structure 36. In addition to FIG. 1A, please refer to FIG. 1B, which shows an enlarged view of the recess and projective structure according to an embodiment of the present invention. As shown in the figure, the one or more projective part 34 includes a top part 322 with a round tip 3221 thereon. The radius of the round tip 3221 is between 0.01 and 0.05 millimeter. The round tips 3221 can avoid flicker points on a glass layer 60 when the light passes through the prism layer 30.

Figure 1C:
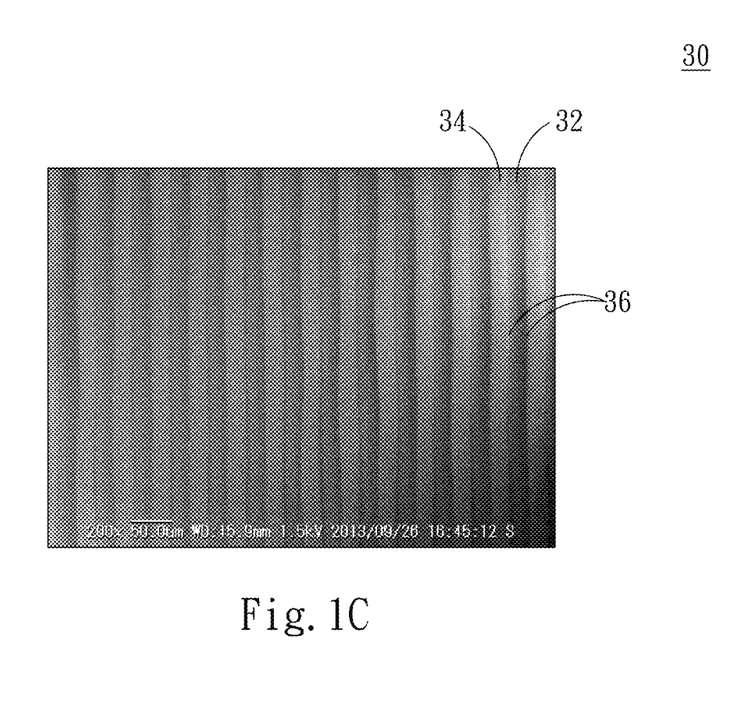
FIG. 1C shows a top view according to an embodiment of the present invention.

Furthermore, in addition to FIG. 1A, please refer to FIG. 1C, which shows a top view according to an embodiment of the present invention. As shown in the figure, according to the top view, it is clear that the nonlinear structure 36 is an irregular wave structure with slight variations. By using this structure, when the light passes through the nonlinear structure 36 and the prism layer 30 and is projected on the glass layer 60, interference fringes can be avoided.

Figure 1D:
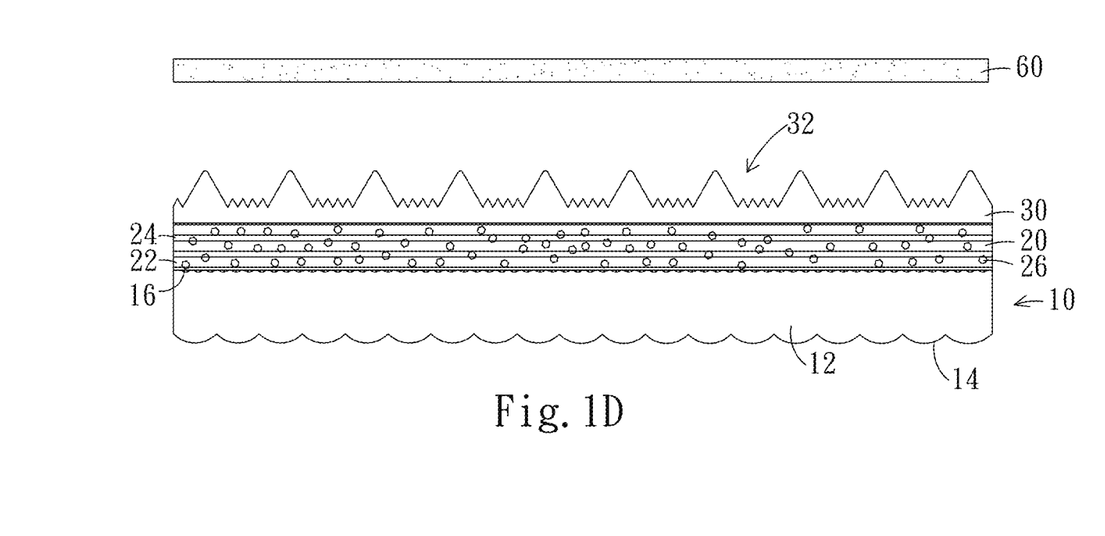
FIG. 1D shows a structural schematic diagram according to an embodiment of the present invention.
Figure 2A:
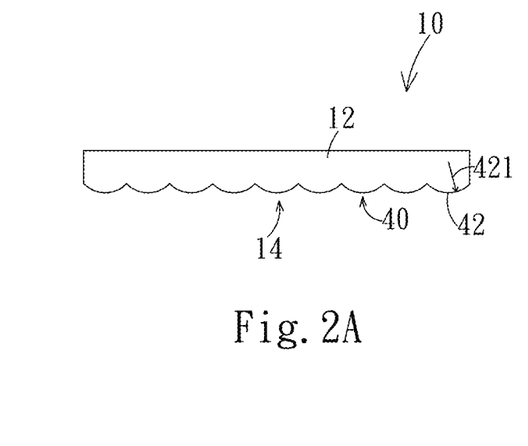
FIG. 2A shows a schematic diagram of a non-spherical structure according to an embodiment of the present invention.
Figure 2B:
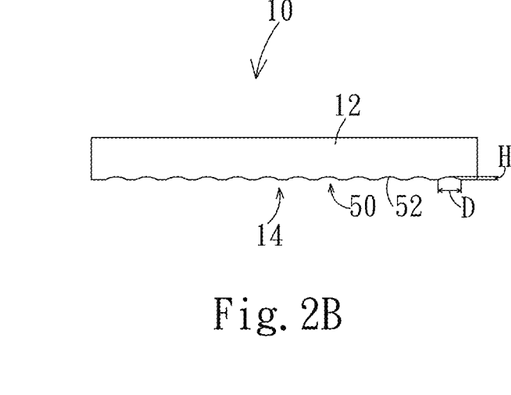
FIG. 2B shows a schematic diagram of a dot structure according to an embodiment of the present invention.

Please refer to FIG. 1D, which shows a structural schematic diagram according to an embodiment of the present invention. As shown in the figure, a second optical structure 16 is disposed on the main body 12. The first optical structure 14 and the second optical structure 16 are non-spherical structures 40 (FIG. 2A) or dot structures 50 (FIG. 2B). By using the first optical structure 14 and the second optical structure 16, the light can be concentrated at different locations and hence increasing the luminance of the light projected on the glass layer 60.

Furthermore, the first optical structure 14 and the second optical structure 16 can be the non-spherical structure 40 as described above. Please refer to FIG. 2A, which shows a schematic diagram of a non-spherical structure according to an embodiment of the present invention. As shown in the figure, the non-spherical structure 40 includes a plurality of curved surfaces 42. Each of the plurality of curved surfaces 42 has a curved-surface radius 421 between 0.02 and 10 millimeters. By using different curved-surface radius 421, the light can be concentrated at different locations.

In addition, the first optical structure 14 and the second optical structure 16 can be the dot structure 50 as described above. Please refer to FIG. 2B, which shows a schematic diagram of a dot structure according to an embodiment of the present invention. As shown in the figure, the dot structure 50 includes a plurality of holes 52 formed by recessing the surface of the base layer 10 to the center. A diameter D of the plurality of holes 52 is between 10 and 100 micrometer; a height H of the plurality of holes 52 is between 1 and 5 micrometers. By adjusting the diameter D and the height H, the light can be concentrated at different locations.

Next, the plurality of optical layers 20 according to the present embodiment are formed by supplying materials to the ultrasonic system by using a peristaltic pump for vibrating thermoplastic resin with different refractive indexes to nanometer-grade micro particles and spraying them on the base layer 10 to form the first optical layer 22 and the second optical layer 24. The first thickness and the second thickness of the first optical layer 22 and the second optical layer 24 are determined by the peristaltic pump and the vibration frequency of the ultrasonic wave. The first thickness and the second thickness are between 40 and 200 nanometers. Moreover, the plurality of optical particles 26 can be added to the resin material for increasing the reflectivity of the plurality of optical layers 20.

Light is formed by light waves. The polarization direction of the light waves (or electromagnetic waves) in the nature is omnidirectional. A single light beam is formed by electric fields in many directions. The polarization of such electromagnetic waves is called unpolarized. Examples of unpolarized light include sunlight and the light from a light bulb. On the contrary, if the electric fields of a light beams oscillate along a single direction, this light beam is called linearly polarized light.

The meaning of linear polarization will be described below. By observing toward the propagation direction of linearly polarized light, the electric field oscillates along a direction with time. When the light wave enters the optical film according to the present embodiment, the unpolarized light can be classified into ineffectively polarized light and effectively polarized light. By using the structure of the plurality of optical layers 20 as described above, namely, the first optical layer 22, the second optical layer 24, and the optical particles 26, the conversion efficiency of ineffectively polarization to effective polarization with the same optical axis can be increased and thus improving the overall light utilization.

Figure 3A:
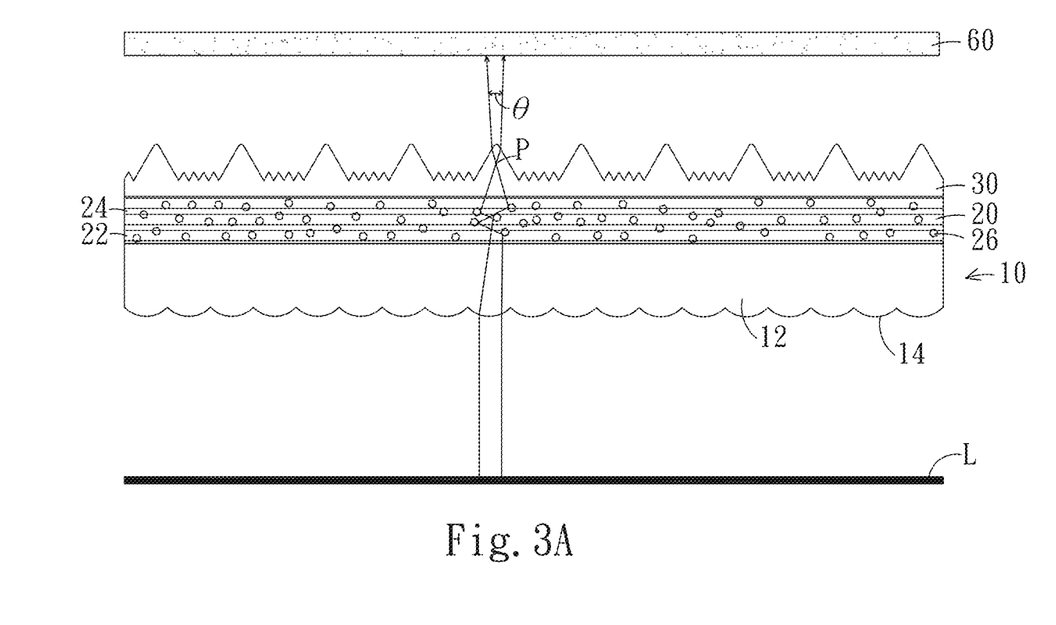
FIG. 3A shows a schematic diagram of an optical path according to a first embodiment of the present invention.

Here, an example will be provided for illustrating the technical features of the present embodiment clearer. The optical film according to the present invention uses the variation of the first optical structure 14 (the non-spherical structure 40 or the dot structure 50) to change the focal location of the incident light, as shown in the first to the third embodiments in FIG. 3A to 3C, respectively. Please refer to FIG. 3A, which shows a schematic diagram of an optical path according to a first embodiment of the present invention. For example, when a light source L of the LCD backlight module is projected to the bottom of the base layer 10, the first optical structure 14 will contrate the light source L and change its incident angle. The light source L is emitted from the backlight module (edge type or direct type). By using the light guide film and diffuser, the light source L will become a uniform plane light source (with uniformity 75~90%). Then the light source L enters the plurality of optical layers 20. By using the plurality of optical particles 26, the first refractive index, and the second refractive index, a first polarization phase and a second polarization phase of the light source L are adjusted to become the same emergent-light phase. Then the light source L is concentrate at a light focal point P on the prism layer 30 and passes through the prism layer 30. An emergent angle θ of the light source L from the prism layer 30 is between 5° and 10°. The light source L is concentrated to emerge and avoiding interference fringes or flicker points on a glass layer 60 after the light passes through the prism layer 30. When the radius of the non-sphere is between 0.085 and 0.145 millimeters, the light source L will be concentrated on the prism layer 30. The advantage of focusing on the prism layer 30 is increasing the collimation of the emergent light and hence enhancing the luminance at the front viewing angle. If the light source L is focused outside the optical film, the viewing angle of the display can be increased.

Figure 3B:
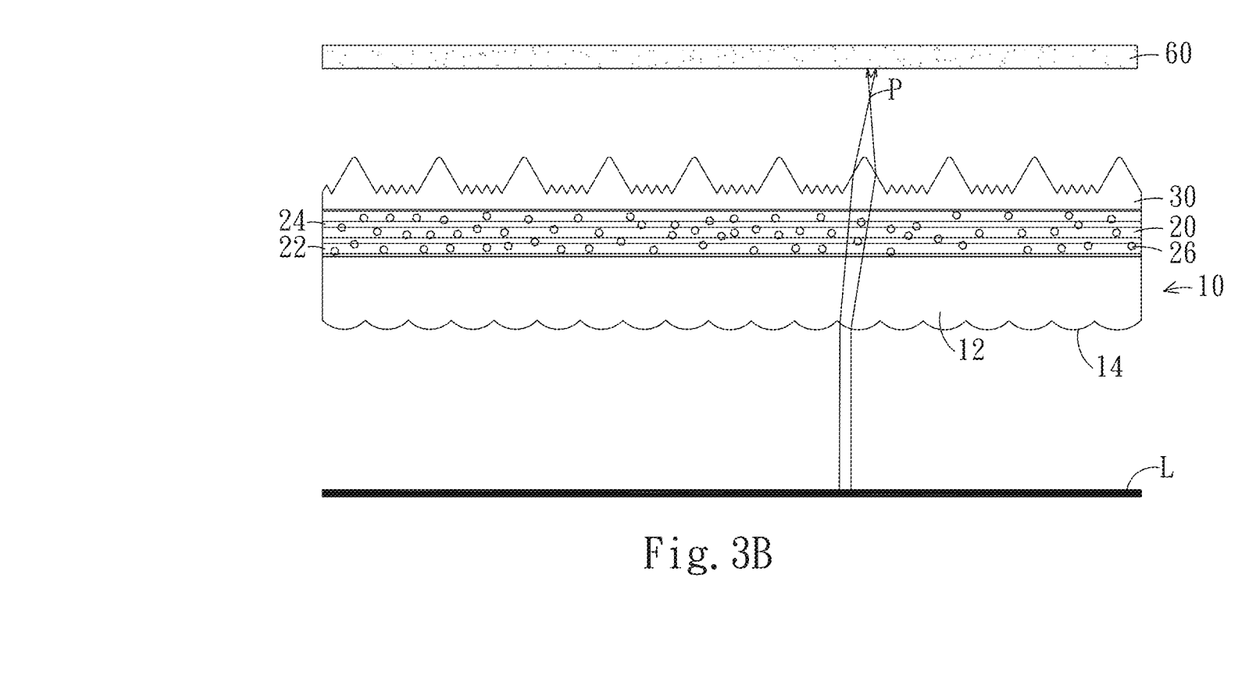
FIG. 3B shows a schematic diagram of an optical path according to a second embodiment of the present invention.
Figure 3C:
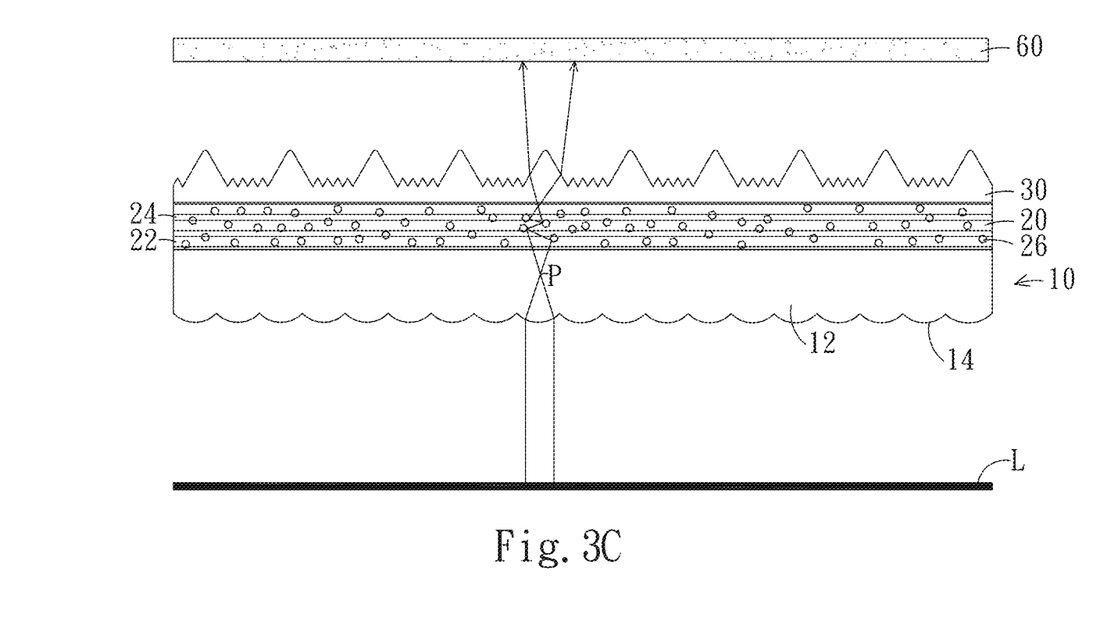
FIG. 3C shows a schematic diagram of an optical path according to a third embodiment of the present invention.

Besides, please refer to FIG. 3B, which shows a schematic diagram of an optical path according to a second embodiment of the present invention. The light focal point P of the light source L can be outside the optical film according to the present invention using the first optical structure 14. In other words, the light focal point P of the light source L is between the prism layer 30 and the glass layer 60. When the radius of the non-sphere or dot is between 0.150 and 0.280 millimeter, the light will be concentrated between the prism layer 30 and the glass layer 60. The advantage of focusing outside the optical film is increasing the viewing angle. For example, the viewing angle of a half of the display can be enlarged. Furthermore, please refer to FIG. 3C, which shows a schematic diagram of an optical path according to a third embodiment of the present invention. As shown in the figure, the light focal point P of the light source L can be on the base layer 10 according to the present invention using the first optical structure 14. When the radius of the non-sphere or dot is between 0.150 and 0.280 millimeter, the light will be concentrated on the base layer 10. The advantage of focusing on the base layer 10 is adjusting and increasing the incident angle of the light entering the plurality of optical layers 20 for enhancing the reflectivity of the plurality of optical layers 20 and thus improving their conversion efficiency for S polarized light.

When the optical film according to the present invention is adopted in an LCD backlight module, the first optical structure 14 will change the focal location. After the light source L passes through the base layer 10, the optical layers 20, and the prism layer 30, it will be projected to the glass layer 60. Then the incident angle and luminous flux of the light source L will be improved and hence achieving the purpose of increasing the luminance of the screen.

As described in the above embodiments, the present invention provides an optical film structure. The first optical structure is disposed below the base layer of the optical film such that the first optical structure can concentrate and alter an incident light source. By using the structure of the plurality of optical layers, the ineffective polarized light of the incident light source can be converted into effective polarized light. In addition, by altering the first optical structure, the incident light source can be concentrated at different focal locations. By using the different focal locations, the luminous flux and brightness projected on the glass layer from the light source and through the optical film.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

What is claimed is:
1. An optical film structure, comprising:
   a base layer, comprising a main body and a first optical structure, said first optical structure disposed below said main body;

a plurality of optical layers, disposed on said base layer, including a first optical layer and a second optical layer, a first material of said first optical layer having a first refractive index, a second material of said second optical layer having a second refractive index, and said first optical layer and said second optical layer including a plurality of optical particles, respectively; and a prism layer, disposed on said plurality of optical layers;

wherein when light from a backlight source is incident on said base layer from the bottom of said base layer, the incident light is refracted by said first optical structure and produces a focal point, the refracted light enters said plurality of optical layers; and by using said plurality of optical particles, said first refractive index, and said second refractive index, a first polarization phase and a second polarization phase of said incident light are adjusted to become the same emergent-light phase before passing through said prism layer.

2. The optical film structure of claim 1, wherein the material of said base layer is PMMA, PET, or PC.

3. The optical film structure of claim 1, wherein a second optical structure is disposed on said main body.

4. The optical film structure of claim 3, wherein said first optical structure and said second optical structure are non-spherical structures or dot structures.

5. The optical film structure of claim 1, wherein a glass layer is disposed on said prism layer.

6. The optical film structure of claim 1, wherein said prism layer includes one or more recess part and one or more projective part; and said one or more recess part and said one or more projective part are adjacent to one another and arranged in a nonlinear structure.

7. The optical film structure of claim 6, wherein said one or more projective part includes a top part with a round tip thereon; and the radius of said round tip is between 0.01 and 0.05 millimeter.

8. The optical film structure of claim 1, wherein the material of said plurality of optical particles is PMMA or PS.

9. The optical film structure of claim 1, wherein said first optical layer has a first thickness; said second optical layer has a second thickness; and said first thickness and said second thickness are between 40 and 200 nanometers.

10. The optical film structure of claim 1, wherein the material of said first material and said second material is PMMA or PS.

11. The optical film structure of claim 1, wherein said focal point is located inside said base layer, inside said prism layer, or outside said optical film.

* * * * *